(12) United States Patent
Kimura (10) Patent No.: US 7,447,127 B2
(45) Date of Patent: Nov. 4, 2008

(54) METHOD AND APPARATUS FOR DISC PLAYBACK (75) Inventor: Masaru Kimura, Iwaki (JP)

(73) Assignee: Alpine Electronics, Inc, Shinagawa-Ku, Tokyo (JP)

(*) Notice: Subject to any disclaimer, the term of this patent is extended or adjusted under 35 U.S.C. 154(b) by 1098 days.

(21) Appl. No.: 10/738,440

(22) Filed: Dec. 16, 2003

(65) Prior Publication Data
US 2004/0167645 A1   Aug. 26, 2004

(30) Foreign Application Priority Data
Dec. 17, 2002   (JP)   ............... 2002-364995

(51) Int. Cl.
G11B 20/10   (2006.01)

(52) U.S. Cl. .................... 369/47.15; 700/94

(58) Field of Classification Search .......... None
See application file for complete search history.

(56) References Cited

U.S. PATENT DOCUMENTS

| 5,115,419 A | * | 5/1992 | Akiyama et al. ......... 369/30.95 |
| 6,272,082 B1 | | 8/2001 | Ishii et al. |
| 6,392,969 B1 | | 5/2002 | Heo |
| 6,618,551 B1 | | 9/2003 | Tanaka et al. |
| 6,687,211 B2 | * | 2/2004 | Sawabe et al. ........... 369/275.3 |

FOREIGN PATENT DOCUMENTS

| JP | 11-162147 | 6/1999 |
| JP | 2002-313030 | 10/2002 |

* cited by examiner

Primary Examiner—Joseph Feild
Assistant Examiner—Tawfik Goma
(74) Attorney, Agent, or Firm—Brinks Hofer Gilson & Lione (57) ABSTRACT In a disc playback apparatus for playing back audio signals recorded on a disc medium, a system controller detects a channel format of the audio signals that can be outputted from the playback apparatus. When content is recorded on a disc so as to be played back in a channel format other than the player channel format, it is not played back.

19 Claims, 11 Drawing Sheets

| GROUP NO. | ATSN<br>(ATS NO.) | ATSI ADDRESS |
|---|---|---|
|  |  |  |
|  |  |  |

Gr#1 ⟶ Gr#2 ⟶ Gr#3 (PGC#1) ⟶ Gr#4 (6ch⟶ 2ch)

METHOD AND APPARATUS FOR DISC PLAYBACK

BACKGROUND OF THE INVENTION

1. Field of the Invention

The present invention relates to a disc-medium playback method and apparatus, and more particularly, to a disc-medium playback method and apparatus that do not repeatedly play back the same musical piece even when the musical piece is recorded in both a two-channel format and a multichannel format.

2. Description of the Related Art

In general, DVD-audio discs are played back by the following three methods:

In a first method, content such as audio titles (ATTs) is divided into groups, and each group is recorded in a two-channel format and a multichannel, for example, six-channel, format in program chains (PGCs). When a DVD player is set for two-channel playback, the group is played back by using a two-channel playback PGC in a PGC block. When the DVD player is set for six-channel playback, the group is played back by using a six-channel playback PGC.

In a second method, content such as ATTs is divided into groups, and each group is recorded in a six-channel format together with a downmix coefficient that represents downmixing from six channels into two channel. When a six-channel DVD player is provided, it plays back the six-channel group. When a two-channel DVD player is provided, it plays back the six-channel group after downmixing into two-channel format.

In a third method, content such as ATTs is divided into groups, and each group is played back.

Japanese Unexamined Patent Application Publication No. 11-250629 suggests a data structure including audio content which has cells for defining an audio title (ATT) playback unit, and whose playback sequence is determined by defining the playback sequence of the cells.

The problem of the same musical piece being repeatedly played back does not occur in the above first and second methods, but occurs in the third method. For example, when Group 1 is provided for a two-channel format and Group 2 is provided for a multichannel format, Group 1 and Group 2 frequently contain the same musical piece. In such cases, when all the groups are played back in group number sequence, as before, each musical piece is played back twice. In a disc changer that normally plays back a disc through and then starts playback of the next disc, a disc change operation is performed after each musical piece is played back twice.

Figure 11A:
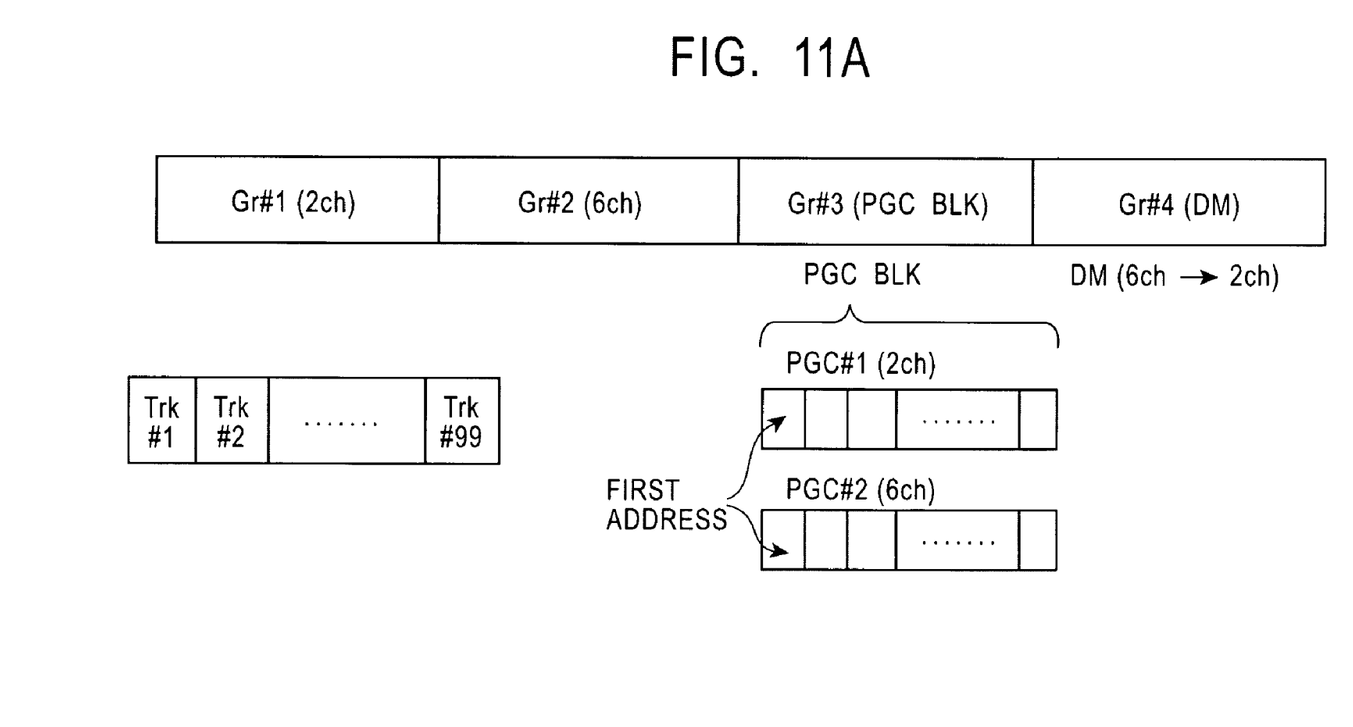
FIGS. 11A and 11B are explanatory views showing the problem of the conventional art.
Figure 11B:
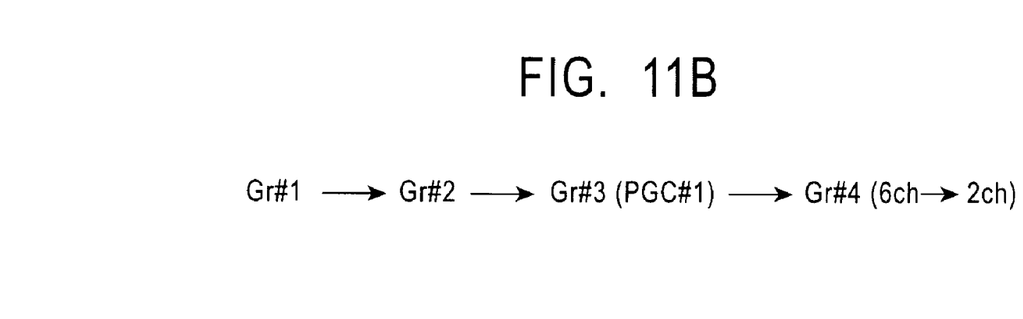

FIGS. 11A and 11B show the problem of the conventional art. A first group Gr#1 is a two-channel group, and a second group Gr#2 is a six-channel group. A third group Gr#3 is a PGC block, and includes a two-channel PGC PGC#1 and a six-channel PGC PGC#2. A fourth group Gr#4 is a downmix (DM) block that is downmixable from six channels to two channels. During playback in an AOP (audio only player) mode, playback is sequentially performed from the first track Trk#1 in the first group Gr#1. When all the tracks in the first group Gr#1 have been played back, the next group Gr#2 is then played back. Therefore, in a case in which a disc having the groups shown in FIG. 11A is played back by a two-channel DVD player, playback is performed in the order shown in FIG. 11B, that is, Gr#1 (2ch)-Gr#2(6ch)-Gr#3 (PGC#1)-Gr#4 (DM). For this reason, the two-channel group Gr#1 and the six-channel group Gr#2 include the same musical piece, and the musical piece is played back twice.

The art disclosed in the above publication cannot overcome such a problem of the same musical piece being played back twice.

SUMMARY OF THE INVENTION

Accordingly, it is an object of the present invention to prevent a musical piece from being played back twice even when the musical piece is contained in different groups.

In order to achieve the above object, according to one embodiment of the present invention provides a disc-medium playback apparatus for playing back audio signals recorded on a disc medium. A channel format of the audio signals that can be outputted from the playback apparatus is detected. When content is recorded on a disc medium that would be played back in a channel format other than the detected output channel format, that content is not played back. That is, when the content is recorded only in a channel format other than the detected output channel format and is not downmixable, it is determined that the content does not satisfy the playback condition, and the content is not played back.

More specifically, navigation data recorded on the disc medium is read before the disc medium is played back to extract groups in the content. Moreover, it is determined whether the groups satisfy the playback condition. The groups that satisfy the playback condition are managed and played back in group number sequence.

Because only groups corresponding to the DVD player channel can be played back, as described above, even when the same musical piece is recorded in groups for different channel formats, a disc change or playback repeat operation can be performed after the musical piece is played back only once.

Further objects, features and advantages of the present invention will become apparent from the following description of the preferred embodiments with reference to the attached drawings.

DESCRIPTION OF THE PREFERRED EMBODIMENTS (A) Outline of the Invention

The preferred embodiments of the present invention provide a technique for performing disc change and repeat playback operations when playing back a disc through without playing back the same musical piece a plurality of times.

A DVD-audio player has a function that allows a user to set the number of output channels. When the DVD-audio player is set in a two-channel (2ch) mode by this channel setting function, playback is performed in the following manner:

(1) Content (musical piece) that is recorded for multichannel playback is skipped.

(2) Two-channel PGC content is selected.

(3) Downmix (DM) content is downmixed.

With reference to the structure described in FIG. 11A, playback in accordance with the presently preferred embodiments is performed as follows, and the same content is not repeatedly played back:

Gr#1 (2ch)-Gr#3 (PGC#1)-Gr#4 (downmix)

When the DVD-audio player is set in a multichannel mode, playback is performed in the following manner:

(1) Content recorded for two-channel playback is skipped.

(2) Multichannel PGC content is selected.

(3) Downmix content is played back without being downmixed.

Referring again to the structure described in FIG. 11A, playback in accordance with the presently preferred embodiments is performed as follows, and the same content is not repeatedly played back:

Gr#2 (6ch)-Gr#3 (PGC#2)-Gr#4 (not downmixed)

By performing the above operation, the same musical piece recorded in different groups is not played back twice, but only once. After that, a disc repeat or playback repeat operation can be performed.

(B) Structure of DVD-Audio Disc (1) Navigation Data and Presentation Data

Data recorded on a DVD-audio disc is broadly divided into two types of data, namely, navigation data and presentation data. Navigation data is the generic name for playback control data, and presentation data is the generic name for audio data or the like to be played back. For example, a DVD-audio player searches for and plays back presentation data (audio data) with reference to the navigation data in accordance with a channel format set by the user.

(2) Volume Structure of DVD-Audio Disc

Figure 1:
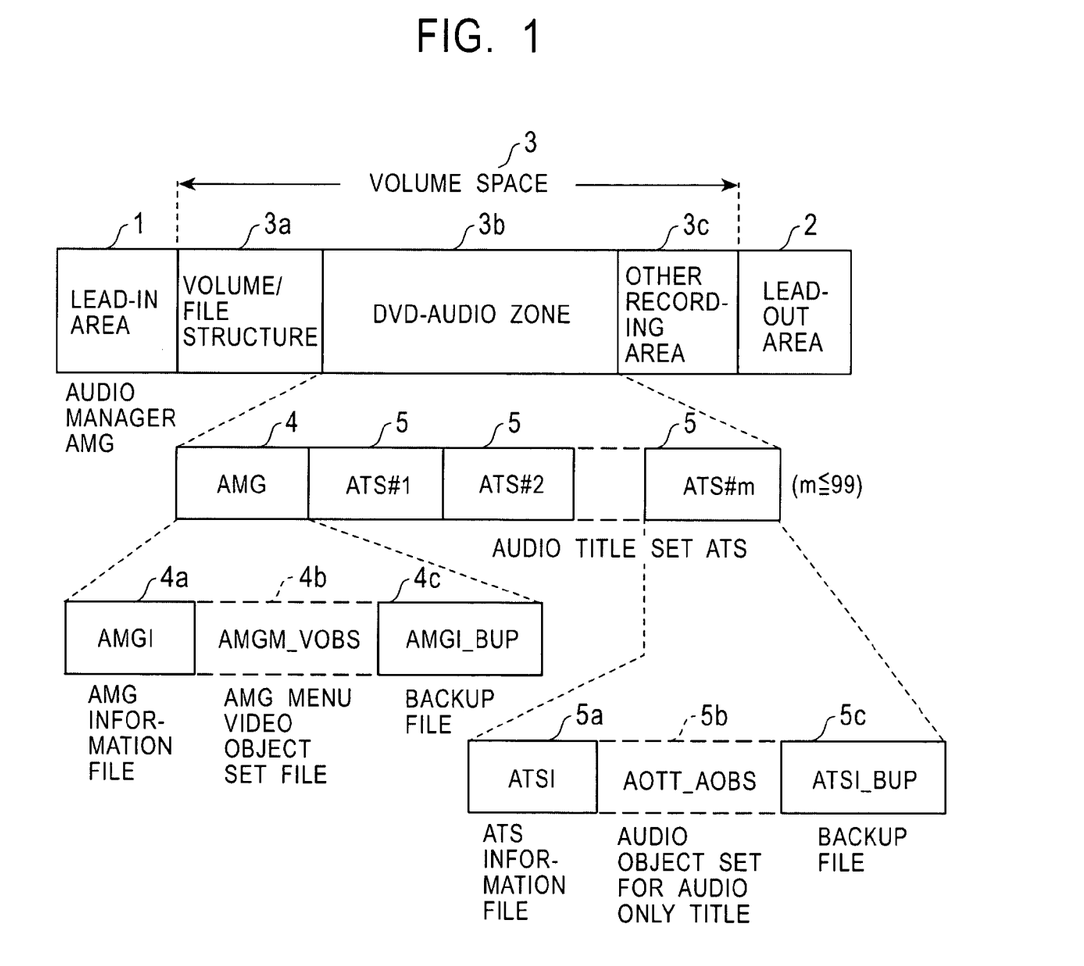
FIG. 1 is an explanatory view of a data recording area provided in a DVD-audio disc.

FIG. 1 shows a data recording area provided on a DVD-audio disc. A data recording area between a lead-in area 1 and a lead-out area 2 serves as a volume space 3.

The volume space 3 includes a volume/file structure area 3a, a DVD-audio zone 3b, and a recording area 3c in which data other than DVD-audio data is recorded. The DVD audio zone 3b includes an audio manager (AMG) 4 and a maximum of ninety-nine audio title sets (ATSs) 5, ATS#1 to ATS#99.

The AMG 4 is provided for all the ATSs 5, and includes an AMGI (AMG information) file 4a for supporting title playback and user operation, an AMGM_VOBS (AMG menu video object set) file 4b for supporting volume access, and a backup file 4c for the AMGI 4a.

Each audio title set (ATS#j) 5 includes a control data file 5a called ATSI (ATS information), an audio object set for audio-only title (AOTT_AOBS) 5b, and a backup file 5c for the ATSI 5a.

The AMGI file 4a and the ATSI file 5a constitute navigation data.

(3) Structure of Audio Object Set AOTT_AOBS

Figure 2:
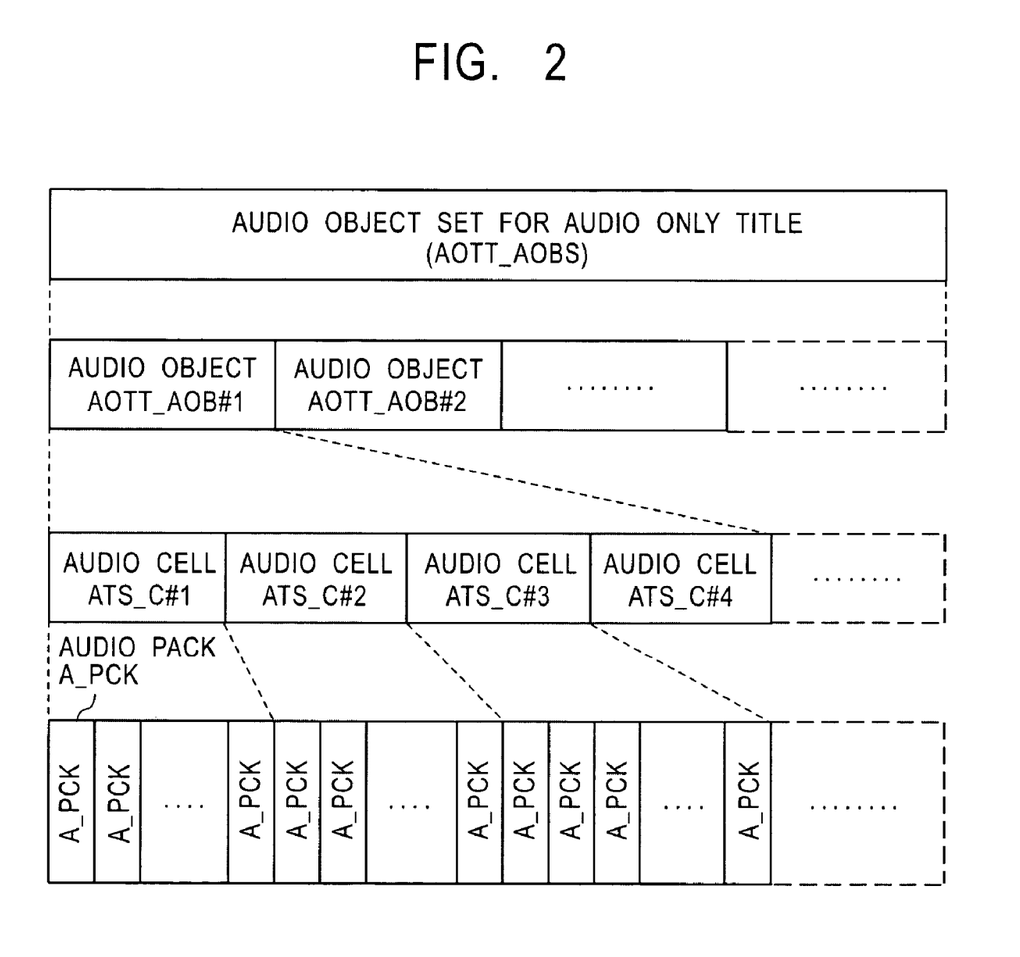
FIG. 2 is a structural view of an audio object set (AOTT_AOBS)

FIG. 2 shows the structure of the audio object set (AOTT_AOBS) 5b. The AOTT_AOBS 5b includes multiple audio objects AOTT_AOB#i (#i represents the AOB number). Each audio object AOTT_AOB#i includes multiple audio title set cells (ATS_C#i), and each audio title set cell includes multiple audio packs A_PCK.

(4) Presentation Structure

Figure 3:
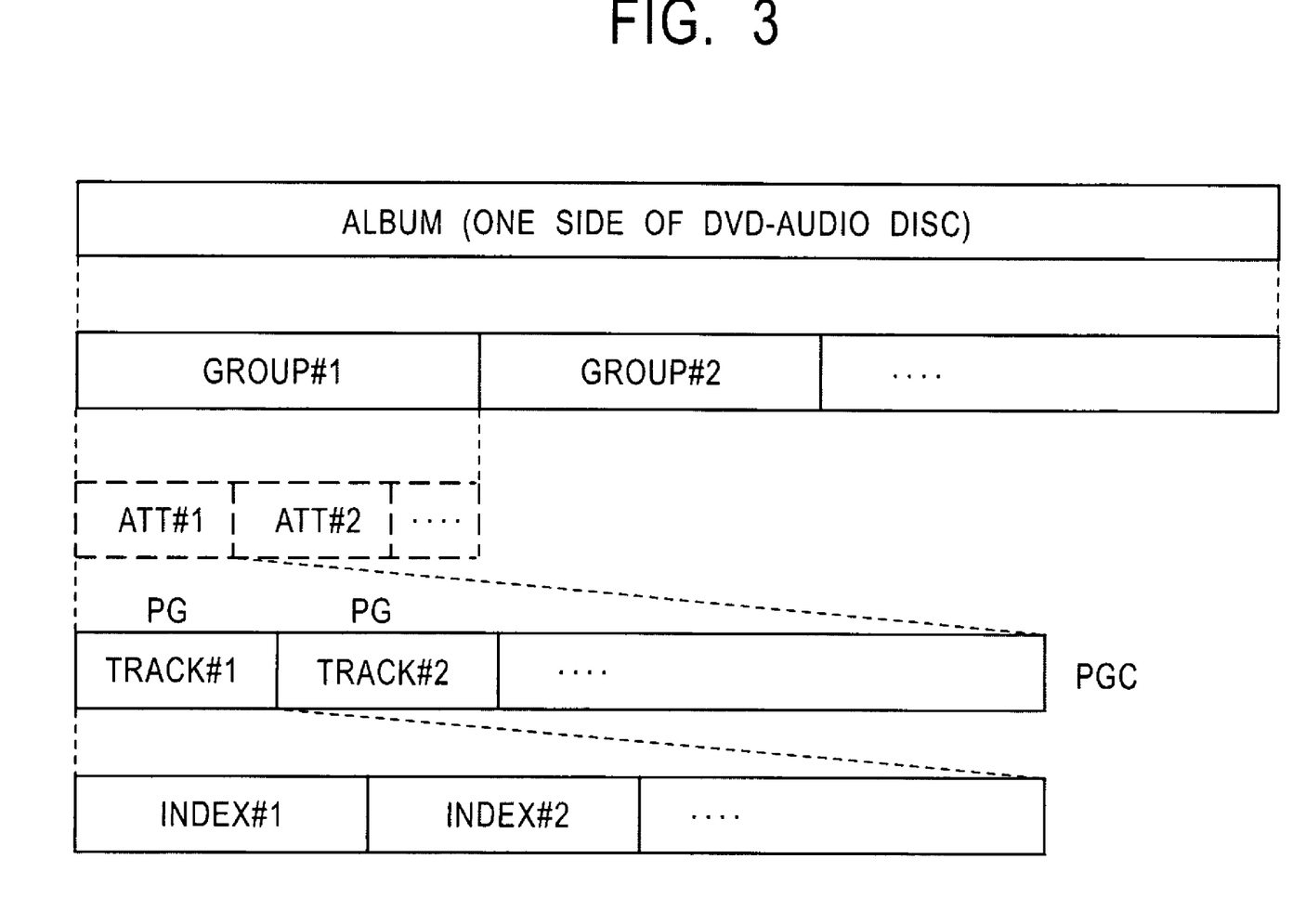
FIG. 3 is an explanatory view showing the presentation structure of content for an audio player.

FIG. 3 is an explanatory view showing the presentation structure of content for the audio player. In this presentation structure, an album includes a maximum of nine groups #i. Each group #i includes at least one audio title ATT#i, each audio title ATT#i includes at least one track #i (program PG defined in PGC), and each track #i includes at least one index (cell).

Figure 4:
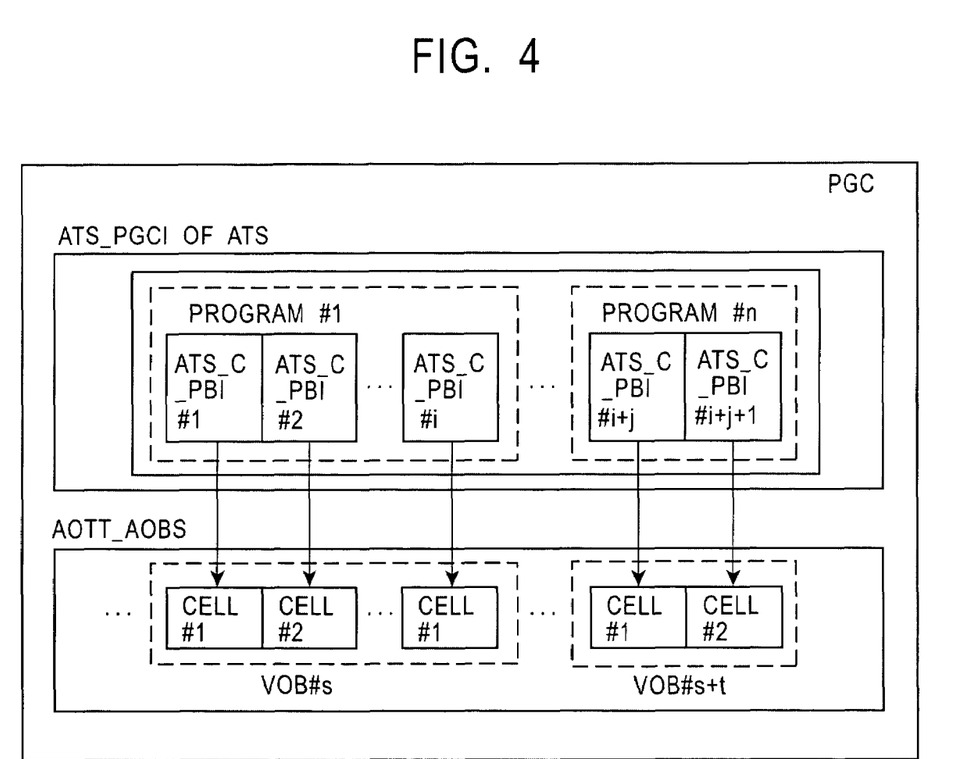
FIG. 4 is an explanatory view showing the program chain (PGC) structure obtained by chain-connecting multiple problems PG.

An audio title set (ATS) has a PGC structure (program chain structure) in which multiple programs PG are chain-connected, as shown in FIG. 4. That is, the PGC structure is obtained by chain-connecting multiple programs PG defined by PGC information (ATS_PGCI). Cells defined in AOTT_AOBS are designated by the cell numbers (cell#j) in each program #i, and are played back in cell number sequence.

(5) Structure of AMGI (AMG Information)

Figure 5:
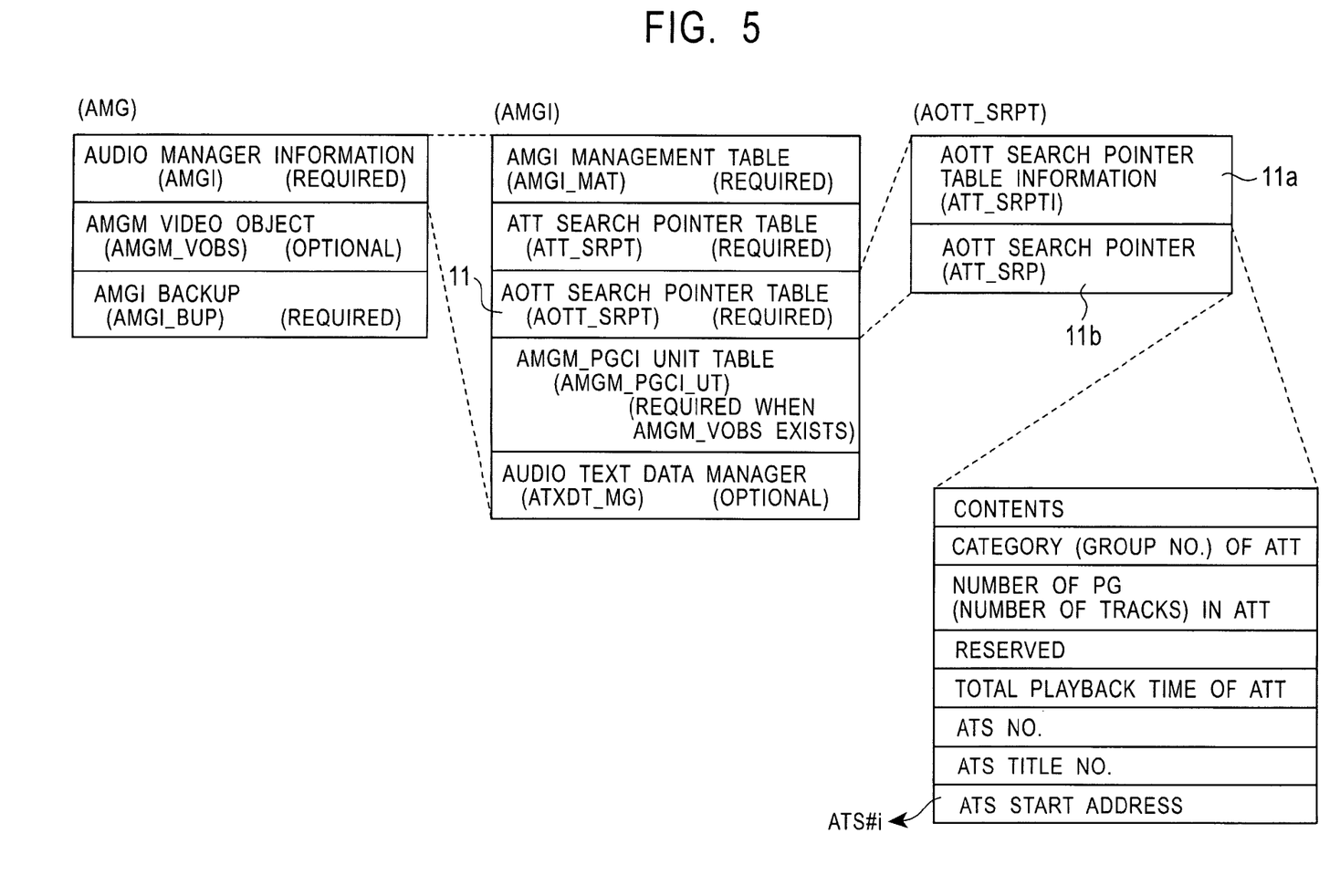
FIG. 5 is an explanatory view of audio manager information (AMGI)

AMGI in the navigation data has the structure shown in FIG. 5. An AOTT search pointer table AOTT_SRPT 11 includes AOTT search pointer table information (AOTT_SRPTI) 11a and an AOTT search pointer (AOTT_SRP) 11b.

The AOTT search pointer table information 11a indicates the number of search pointers (the number of audio titles ATT), and the AOTT search pointer 11b includes the group number, ATS number, and ATS start address for each audio title ATT. That is, the group number of the audio title ATT can be determined from the AOTT search pointer 11b.

(6) Structure of ATSI (Audio Title Set Information)

Figure 6:
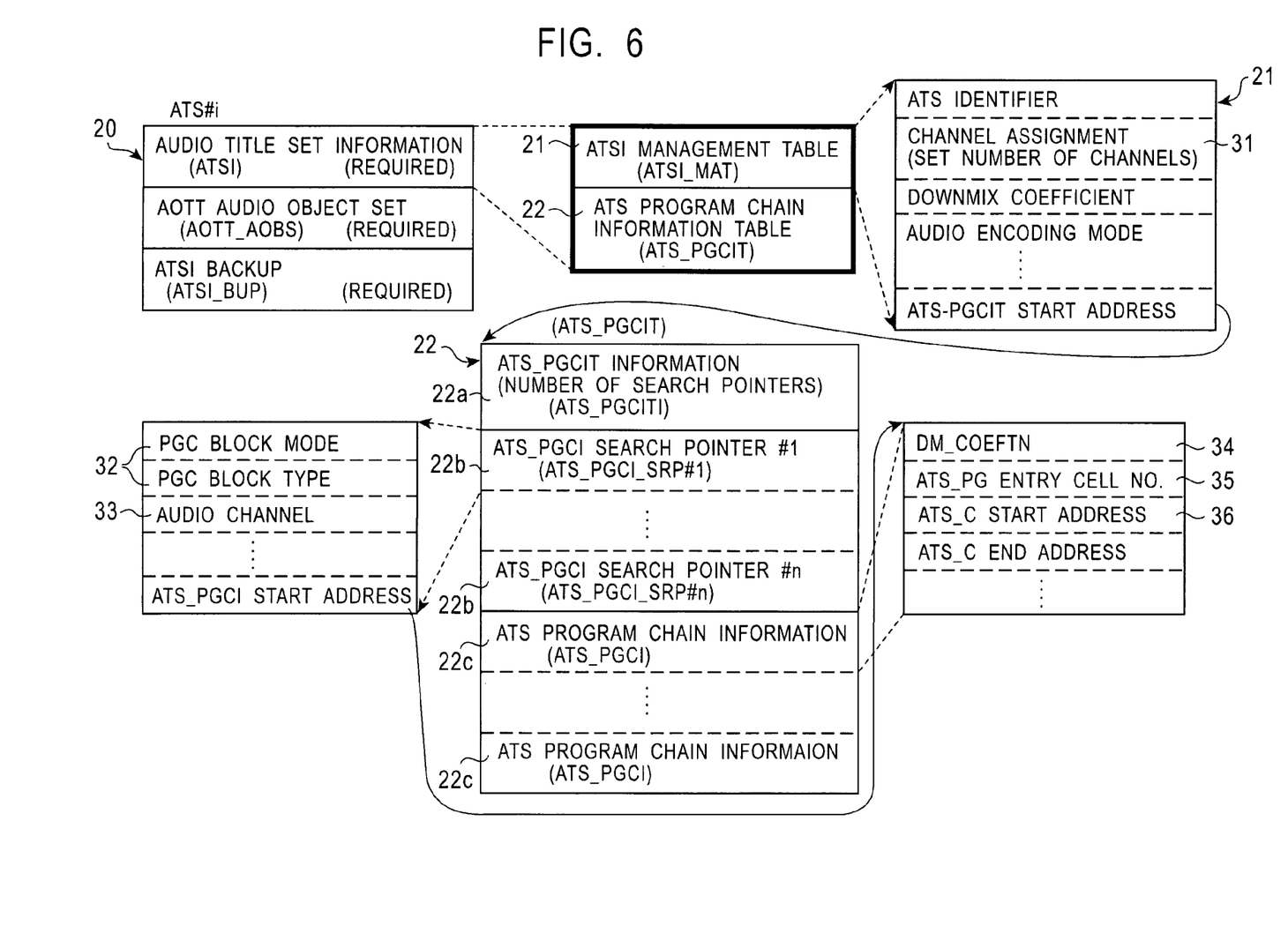
FIG. 6 is an explanatory view of audio title set information (ATSI)

ATSI 20 in the navigation data includes an ATSI management table (ATSI_MAT) 21 and an ATS program chain information table (ATS_PGCIT) 22, as shown in FIG. 6. The ATSI_MAT 21 stores an ATS identifier, a channel assignment 31 (for distinguishing between two-channel and multichannel), a downmix coefficient (DM coefficient), an audio encoding mode, an ATS_PGCIT start address, and so on.

Therefore, the channel type (two-channel or multichannel) of the ATS group can be determined from the ATSI_MAT 21.

The ATS_PGCIT 22 includes, for each ATS, ATS_PGCIT information (ATS_PGCITI) 22a indicating the number n of ATS_PGCI search pointers (ATS_PGCI_SRP), ATS_PGCI search pointers #1 to #n (ATS_PGCI_SRP#i) 22b, and ATS program chain information (ATS_PGCI) 22c.

Each of the ATS_PGCI search pointers (#1 to #n) 22b stores a PGC block mode/PGC block type 32 indicating whether a PGC block is provided, an audio channel 33 indicating the channel type (two-channel or multichannel) of the PGC block, and an ATS_PGCI start address.

Each ATS program chain information (ATS_PGCI) 22c stores information (DM_COEFTN) 34 about whether downmixing from multichannel into two-channel is possible, the entry cell number (start cell number in the track) 35 for the ATS_PG, a start address 36, an end address, and so on for the ATS_C.

By checking AMGI and ATSI serving as navigation data in the above-described structures, the group number and the group channel type are determined. Moreover it is possible to determine whether an ATT that constitutes a group is composed of a PGC block, to determine the channel type when the ATT is composed of a PGC block, and to determine whether downmixing is possible.

(C) Configuration of DVD-Video Playback Apparatus

Figure 7:
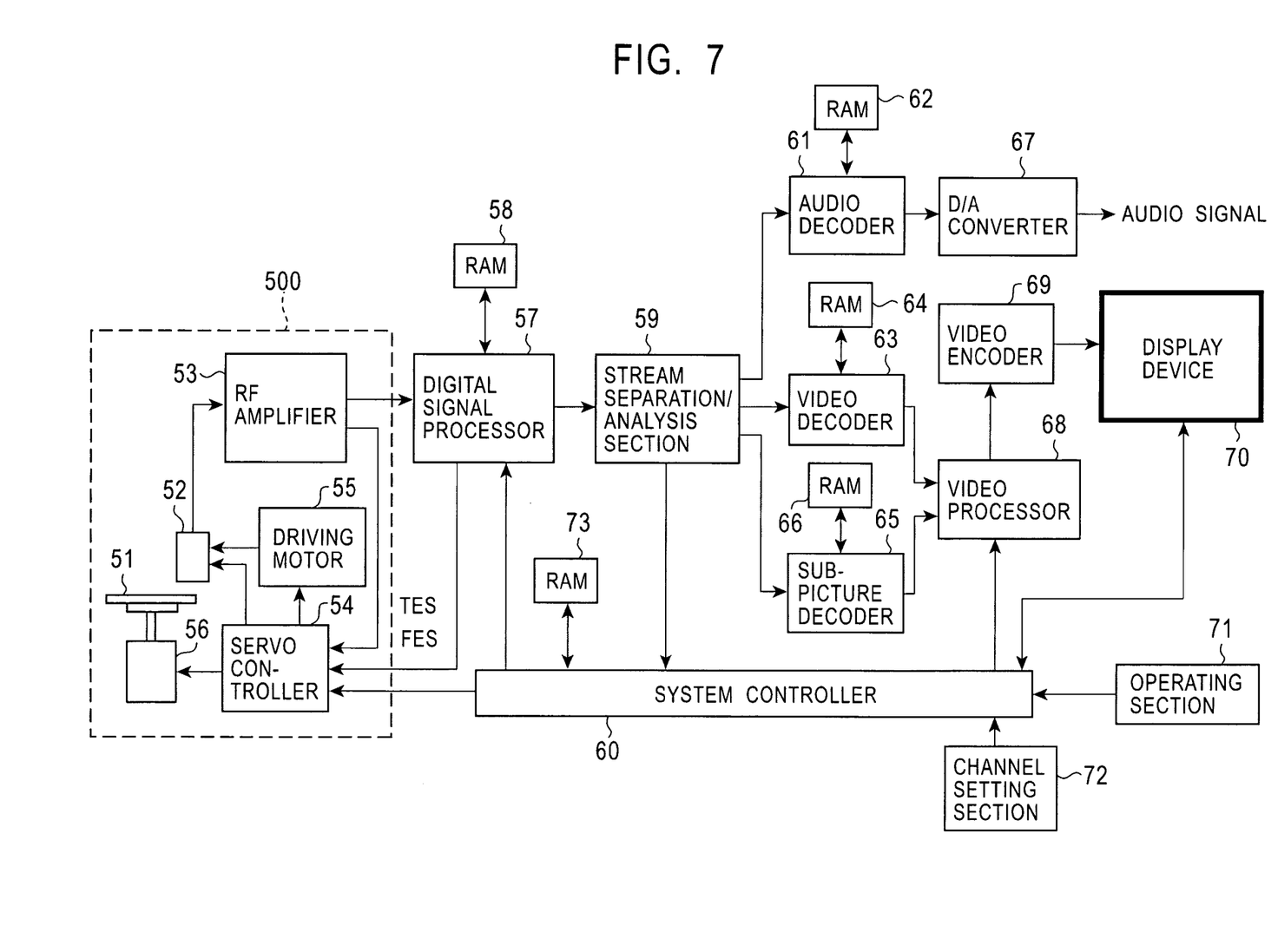
FIG. 7 is an explanatory view showing the overall configuration of a DVD-video playback apparatus having an audio playback function.

FIG. 7 shows the overall configuration of a DVD-video playback apparatus having an audio playback function. A video playback function does not have to be performed.

A signal read from a DVD-audio disc 51 by an optical pickup 52 is inputted to a radio-frequency (RF) amplifier 53. The RF amplifier 53 outputs the input signal to the next stage after RF amplification, and generates and inputs a tracking error signal TES and a focusing error signal FES to a servo controller 54. The servo controller 54 drives a driving motor 55 according to the tracking error signal TES to exert tracking servo control, and moves the optical pickup 52 in the radial direction of a disc to a predetermined position under instructions from a system controller 60. The servo controller 54 drives an actuator according to the focusing error signal FES to exert focusing servo control so that the optical pickup 52 is focused on the disc surface (an in-focus state is brought about). Moreover, the servo controller 54 controls a spindle motor 56 to rotate at a constant peripheral velocity. The above-described components 51 to 56 constitute a playback section 500.

A digital signal processor 57 performs, with a RAM 58, for example, demodulation of DVD modulation signals, error correction, digital authentication, and transferring of a bit stream (DVD data) in response to a data transfer request from a stream separation/analysis section 59. The stream separation/analysis section 59 analyzes the DVD data stream, inputs navigation data to the system controller 60, and inputs audio data to an audio decoder 61. When a DVD-video disc is played back, the stream separation/analysis section 59 analyzes the DVD data stream, inputs navigation data to the system controller 60, and separates the DVD data into a main picture corresponding to the selected video title, a subpicture using the selected language, and audio data using the selected language.

Figure 8:
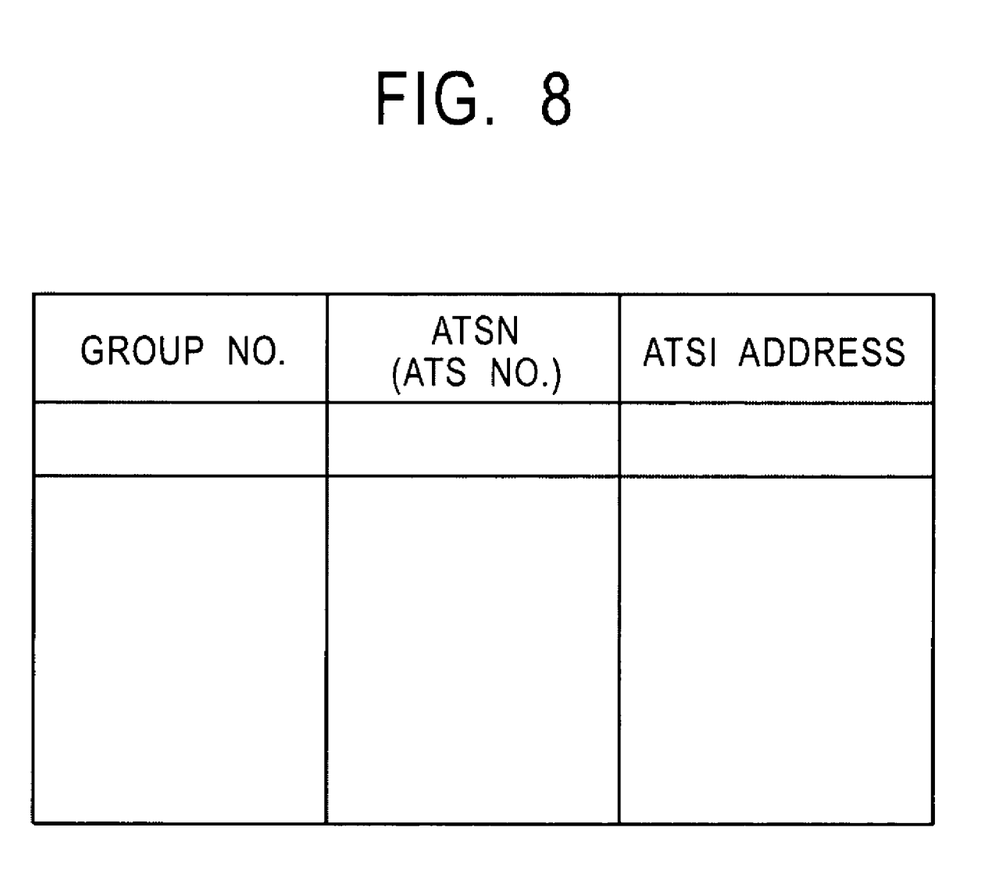
FIG. 8 is an explanatory view of a table.

The system controller 60 controls the individual components, and determines whether each of the groups includes PGC content, downmixable content, or other content, on the basis of the navigation data input from the stream separation/analysis section 59. The system controller 60 also determines whether the DVD disc player is set for a two-channel format or a multichannel format. When the DVD disc player is set for the two-channel format, the system controller 60 sequentially lists, in a table, the ATS numbers and ATSI addresses of ATTs in each group that can be played back in the two-channel format, as shown in FIG. 8, and stores the table in a RAM 73. When the DVD disc player is set for the multichannel format, the system controller 60 sequentially lists, in a table, the ATS numbers and ATSI addresses of ATTs in each group that can be played back in the multichannel format, as shown in FIG. 8, and stores the table in the RAM 73. That is, the content is managed in group number sequence.

Subsequently, the system controller 60 sends the ATSI address of the first ATS number in the first group to the servo controller 54 to position the optical pickup 52 to the address, reads ATS information (ATSI) from the address, and starts an audio playback operation according to the ATSI. When all the musical pieces at the first ATS number have been played back, ATS information (ATSI) is read from the ATSI address of the next ATS number, and playback is performed according to the ATSI. The playback operation is continued while sequentially changing the group number and ATS number.

The audio decoder 61 decodes compressed audio data into PCM audio data with a RAM 62, and outputs the PCM audio data. A D/A converter 67 converts the PCM audio data into analog data, and outputs the analog data.

In a case in which a video disc is used, a video decoder 63 decodes and outputs MPEG video data for the main picture with a RAM 64. A subpicture decoder 65 decodes and outputs compressed data for the subpicture with a RAM 66. A video processor 68 superimposes and inputs the main picture and the subpicture to a video encoder 69. The video encoder 69 encodes the input picture signals into NTSC or PAL signals, and inputs the signals to a display device 70. The display device 70 displays the input picture on a display screen.

Various input operations to the system controller 60 are performed with an operating section 71. The number of output channels is set and input to the system controller 60 through a channel setting section 72.

Figure 9:
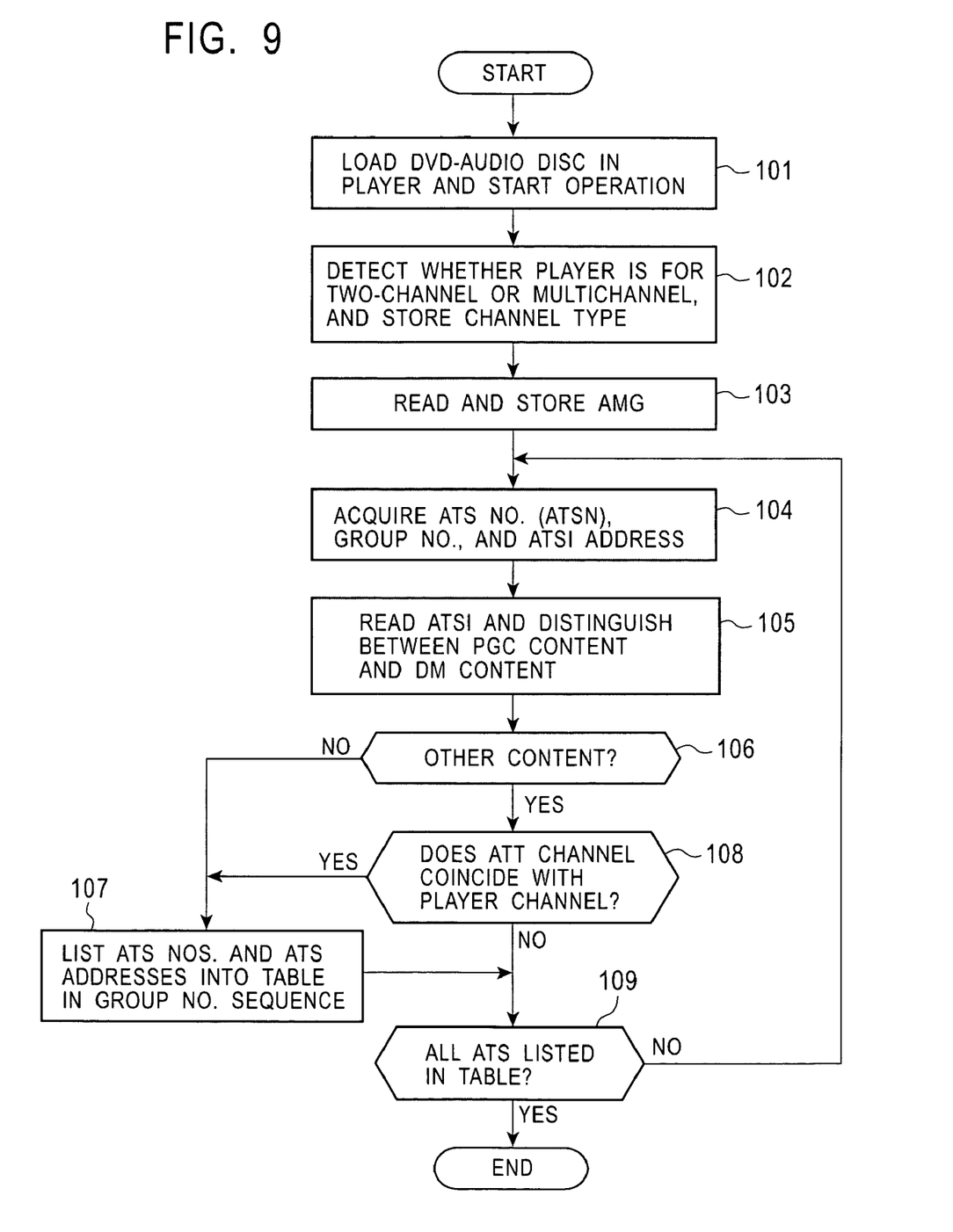
FIG. 9 is a flowchart showing a procedure for controlling the selection of groups corresponding to a DVD player channel.

(D) Processing (a) Control of Group Selection Corresponding to DVD Player Channel FIG. 9 is a flowchart showing the procedure for controlling the selection of groups corresponding to the DVD player channel.

A DVD-audio disc is loaded in the DVD player and the operation is started (act 101). In response thereto, the system controller 60 checks whether the DVD player is set by the user for the two-channel format or the multichannel format (act 102). The channel setting is made by operating the channel setting section 72, a channel setting key, or a channel setting screen.

Subsequently, the system controller 60 reads and stores an audio manager AMG through the stream separation/analysis section 59 (act 103), acquires the ATS number, ATSI address, group number of the first audio title ATT (or AOTT) (act 104), reads ATS information (ATSI) from the address designated by the ATSI address, and determines whether the audio title ATT includes PGC block content, downmixable content, or other content (act 105).

When the audio title ATT does not include other content, that is, it includes PGC block content or downmixable content, the ATS numbers and ATSI addresses are put into a table (see FIG. 8) in group number sequence, and are stored in the RAM 73 (act 107). When it is determined in act 106 that the audio title ATT includes other content, it is checked whether the channel type of the ATT coincides with the player channel detected in Step 102 (act 108). When the channel types coincide, the ATS numbers and ATSI addresses are put into a table (see FIG. 8) in group number sequence, and are stored in the RAM 73 (act 107).

After that, it is checked whether all the ATSs stored in the DVD-audio disc have been listed in a table (FIG. 8) (act 109). As long as the listing is not completed, the next ATT is subjected to act 104 and subsequent acts described above according to AMGI information and ATSI information.

In the above-described procedure, audio titles ATTs corresponding to the player channel are sequentially stored with the ATS numbers and ATSI addresses, as shown in FIG. 8.

In short, in a case in which content is recorded on a disc medium so that it is played back in a channel format other than the player output channel format, it is not registered in the table and is not played back. That is, when the content is recorded only in a channel format other than the player output channel format, and is not downmixable, it is determined that the content does not satisfy the playback condition, and the content is not registered in the table and is not played back.

(b) Playback Control

Figure 10:
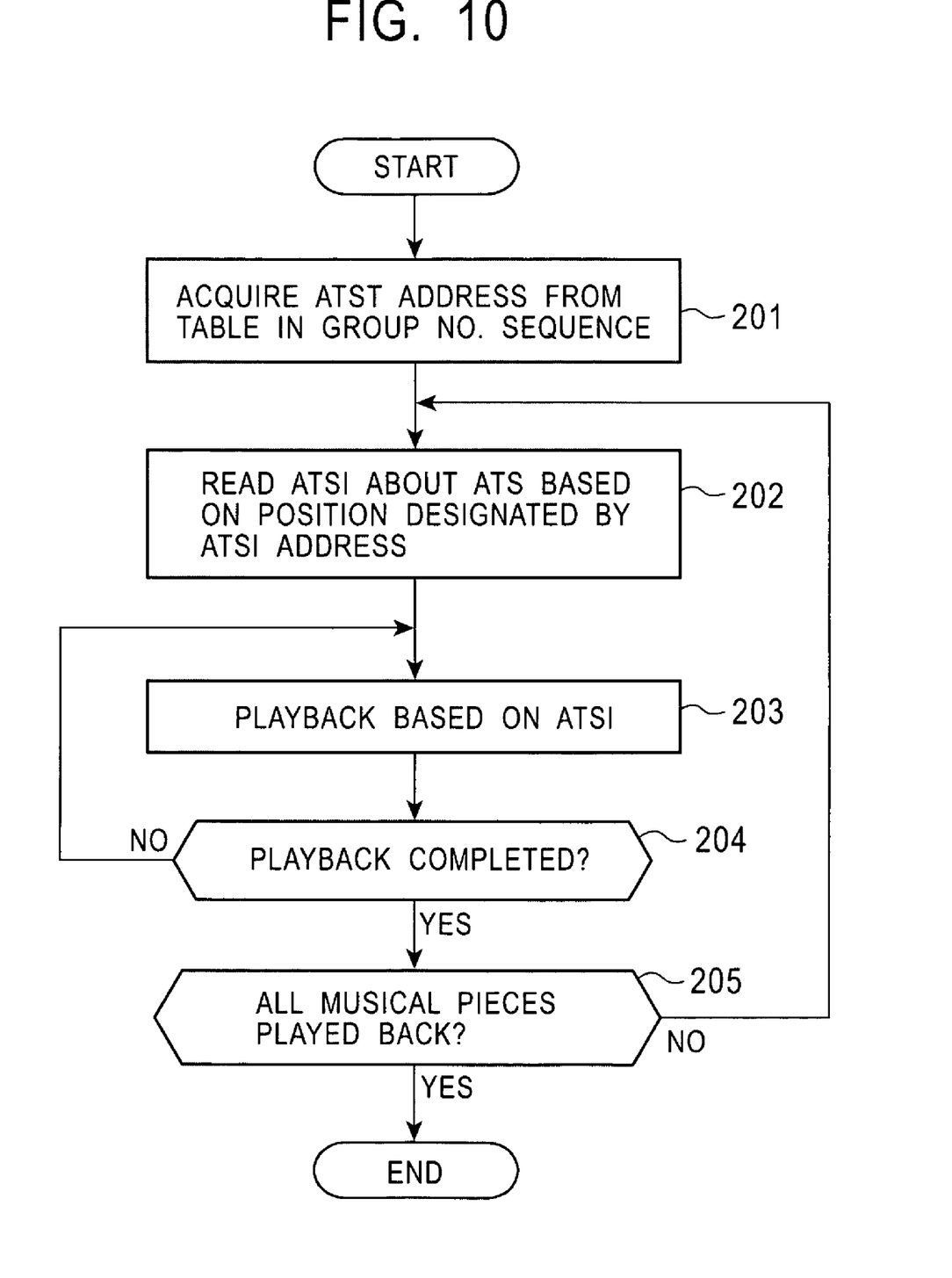
FIG. 10 is a flowchart showing the playback control procedure after a table is created.

FIG. 10 is a flowchart showing the playback control procedure after a table is created in the procedure shown in FIG. 9.

After the table is completed, the system controller 60 acquires the ATSI address of the first audio title ATT in the first group (act 201). The system controller 60 then reads ATS information (ATSI) about the first ATT on the basis of a position indicated by the ATSI address in servo control (act 202).

Subsequently, the first ATT is played back according to the read ATSI (act 203). When playback is completed (act 204), it is checked whether all the ATTs in all the groups stored in the table have been played back (act 205). When playback is not completed, the above acts are repeated for the next audio title ATT, and all the ATTs in all the groups are sequentially played back.

Through the above procedures, only the groups corresponding to the DVD player channel (two-channel or multi-channel) can be played back. Therefore, even when a musical piece is recorded in both the groups for different channels, the disc change operation or playback repeat operation can be performed after the musical piece is played back only once.

While the determination of playback is made for each group in the above description, it may be made for each audio title ATT, and playback control may be exerted based on this determination.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for playing back audio signals recorded on a disc, comprising the acts of:
    determining a player channel format of audio signals outputted from a disc player;
    reviewing a disc to identify content compatible with the player channel format of the disc player;
    skipping content that is recorded in a format that is not compatible with the player channel format;
    playing back content that is compatible with the player channel format; and
    downmixing skipped content that is recorded in a format that is not compatible with the player channel format into content that is compatible with the player channel format after the act of playing back content that is compatible with the player channel format.

2. The method of claim 1, further comprising the acts of:
    reading navigation data recorded on the disc;
    extracting groups from the disc; and
    identifying groups with content compatible with the player channel format of the disc player;
    wherein playing back content that is compatible with the player channel format comprises playing back the groups with content compatible with the player channel format of the disc player.

3. The method of claim 1, further comprising the acts of:
    reading navigation data recorded on the disc;
    extracting audio titles from the disc; and
    identifying audio titles compatible with the player channel format of the disc player;
    wherein playing back content that is compatible with the player channel format comprises playing back the audio titles compatible with the player channel format of the disc player.

4. The method of claim 1, further comprising the acts of:
    reading navigation data recorded on the disc;
    extracting groups from the content of the disc
    identifying groups that will provide audio signals compatible with the player channel format of the disc player; and
    repeating playback of the groups in group number sequence;
    wherein playing back content that is compatible with the player channel format comprises playing back the groups that will provide audio signals compatible with the player channel format of the disc player.

5. The method of claim 1 further comprising the acts of:
    providing a second disc; and
    playing back content on the second disc after playback of a previous disc is complete.

6. The method according of claim 1 wherein the content on the disc includes music data.

7. A method for playing back audio signals recorded on a disc, comprising the acts of:
    detecting a disc player audio output channel type;
    retrieving audio manager data from a disk;
    acquiring audio title set information from the disc;
    skipping audio title set information for content of the audio title set that is not compatible with the disc player audio output channel type;
    placing audio title set information in a table if the content of the audio title set is compatible with the disc player audio output channel type;
    placing skipped audio title set information in the table for content of the audio title set that is not compatible with the disc player audio output channel type but is downmixable to content that is compatible with the disc player audio channel type after the act of placing audio title set information in the table if the content of the audio title set is compatible with the disc payer audio output channel type; and
    playing back audio signals corresponding to the audio title set information in the table.

8. The method of claim 7 wherein the audio title set information comprises an ATS number, ATSI address and a group number of the first audio title.

9. An audio signal disc playback apparatus for playing back audio signals recorded on a disc, comprising:
    a disc player operable to output audio signals from content stored on a disc;
    a channel setting section operable to set a channel format of the audio signals outputted from the disc player; and
    a playback control section operable to determine whether content is recorded on the disc is in a channel format other than the set channel format, to skip content that is recorded in a channel format that is not compatible with the set channel format, to play back content that is compatible with the set channel format, and to downmix skipped content that is recorded in a format that is not compatible with the set channel format into content that is compatible with the set channel format after playing back content that is compatible with the set channel format.

10. The apparatus of claim 9, wherein the playback control section is operable to read navigation data recorded on the disc before the disc is played back in order to extract groups in the content, determine whether the groups satisfy a playback condition, and register the groups that satisfy the playback condition.

11. The apparatus of claim 10, further comprising:
a management section operable to register the groups that satisfy the playback condition; and
a playback section operable to play back the groups in group number sequence.

12. The apparatus of claim 10, further comprising:
a management section operable to register the audio titles that satisfy the playback condition are registered and managed; and
a playback section operable to play the audio titles.

13. The apparatus of claim 10, further comprising:
a management section operable to register groups that satisfy the playback condition; and
a playback section operable to perform a playback repeat operation for repeating the playback of the groups in group number sequence.

14. The apparatus of claim 9 further comprising:
a disc selecting section operable to select a disc from a plurality of discs.

15. The apparatus of claim 14, wherein when the content is recorded only in a channel format that is incompatible with the set channel format, the playback control section determines that the content does not satisfy a playback condition, and selects the next disc.

16. The apparatus of claim 14, wherein the playback control section reads is operable to navigation data recorded on a disc before the disc is played back in order to extract groups in the content, to determine whether the groups satisfy a playback condition, and register the groups that satisfies the playback condition.

17. The apparatus of claim 16, further comprising:
a management section operable to register groups that satisfy the playback condition; and
a playback section operable to play back the groups in group number sequence, and select and play back a disc from the plurality of discs after the playback of a previous disc is complete.

18. The apparatus of claim 16, further comprising:
a management section operable to register audio titles that satisfy the playback condition; and
a playback section operable to for play back the audio titles, and select and play back a disc from the plurality of discs after the playback of a previous disc is complete.

19. The apparatus of claim 9 wherein the content on the disc includes music data.

* * * * *

UNITED STATES PATENT AND TRADEMARK OFFICE
CERTIFICATE OF CORRECTION

PATENT NO. : 7,447,127 B2 Page 1 of 1
APPLICATION NO. : 10/738440
DATED : November 4, 2008
INVENTOR(S) : Masaru Kimura It is certified that error appears in the above-identified patent and that said Letters Patent is hereby corrected as shown below:

On the Title Page

Item (73), after "Electronics," delete "Inc," and substitute --Inc.,-- in its place.

In column 8, claim 7, line 36, after "with the disc" delete "payer" and substitute --player-- in its place.

Signed and Sealed this

Twenty-third Day of June, 2009

JOHN DOLL
*Acting Director of the United States Patent and Trademark Office*